(12) United States Patent
Shaw

(10) Patent No.: US 10,724,601 B2
(45) Date of Patent: *Jul. 28, 2020

(54) BELT SPLICER

(71) Applicant: Shaw-ALmex Industries Limited, Parry Sound (CA)

(72) Inventor: Timothy Glen Shaw, Stoney Creek (CA)

(73) Assignee: Shaw-Almex Industries Limited, Parry Sound (CA)

( * ) Notice: Subject to any disclaimer, the term of this patent is extended or adjusted under 35 U.S.C. 154(b) by 4 days.

This patent is subject to a terminal disclaimer.

(21) Appl. No.: 15/804,470

(22) Filed: Nov. 6, 2017

(65) Prior Publication Data

US 2018/0119774 A1    May 3, 2018

Related U.S. Application Data

(62) Division of application No. 14/009,595, filed on Oct. 3, 2013, now Pat. No. 9,810,284.

(30) Foreign Application Priority Data

Apr. 4, 2011    (GB) .................................. 1105764.3

(51) Int. Cl.
| | |
|---|---|
| *F16G 3/16* | (2006.01) |
| *F16G 3/10* | (2006.01) |
| *B65H 21/00* | (2006.01) |
| *B30B 15/04* | (2006.01) |
| *B29C 65/00* | (2006.01) |

(52) U.S. Cl.
CPC ............ *F16G 3/16* (2013.01); *B29C 66/4324* (2013.01); *B29C 66/855* (2013.01); *B30B 15/04* (2013.01); *B65H 21/00* (2013.01); *F16G 3/10* (2013.01); *B29C 66/4322* (2013.01)

(58) Field of Classification Search
CPC ..... F16G 3/16; B30B 15/044; B29C 66/4322; B29C 66/4324; B29C 66/816; B29C 66/824; B29C 66/855

See application file for complete search history.

(56) References Cited

U.S. PATENT DOCUMENTS 2,248,499 A * 7/1941 Heintz .................... B29C 73/30
                                                      156/502
3,228,481 A    1/1966 Eldred
3,355,343 A * 11/1967 Beck ....................... B29C 65/00
                                                      156/304.7

(Continued)

FOREIGN PATENT DOCUMENTS

| EP | 1564355 A1 * | 8/2005 | ........... E05C 17/203 |
|---|---|---|---|
| WO | WO-2009015823 A1 * | 2/2009 | ............. B30B 1/003 |
| WO | WO-2017045083 A1 * | 3/2017 | ............... F16G 3/10 |

*Primary Examiner* — Mark A Osele
(74) *Attorney, Agent, or Firm* — Defillo & Associates, Inc.; Evelyn A Defillo

(57) ABSTRACT

A tension-link of the belt-splicer is based on a rope-loop of high-strength synthetic fibre, wound around bosses. The bosses and the loop are encapsulated in moulded plastic. The link connects cross-beams of the splicer. The link includes couplings which permit rotation when the beams deflect in bending. The links can be stored inside the hollow interior of the beams. The couplings include eccentrically-mounted blocks that can be orientated to adjust the length of the link.

18 Claims, 10 Drawing Sheets

(56) References Cited

U.S. PATENT DOCUMENTS

| | | | | |
|---|---|---|---|---|
| 3,808,968 | A * | 5/1974 | Notin | B25B 5/065 100/264 |
| 3,969,051 | A * | 7/1976 | Hovila | B29C 35/02 425/11 |
| 4,187,776 | A * | 2/1980 | Schroder | B29C 43/34 100/211 |
| 4,430,146 | A * | 2/1984 | Johnson | B29C 65/18 156/502 |
| 4,554,043 | A * | 11/1985 | Fudickar | B29C 65/18 100/269.03 |
| 4,609,100 | A * | 9/1986 | Fudickar | B65G 15/00 100/258 A |
| 4,946,541 | A * | 8/1990 | Thies | B29C 43/32 100/258 A |
| 7,325,580 | B2 * | 2/2008 | Woolner | F16G 3/16 100/269.03 |
| 7,650,987 | B2 * | 1/2010 | Taniguchi | B29C 65/02 198/844.2 |
| 9,810,284 | B2 * | 11/2017 | Shaw | B30B 15/04 |

* cited by examiner

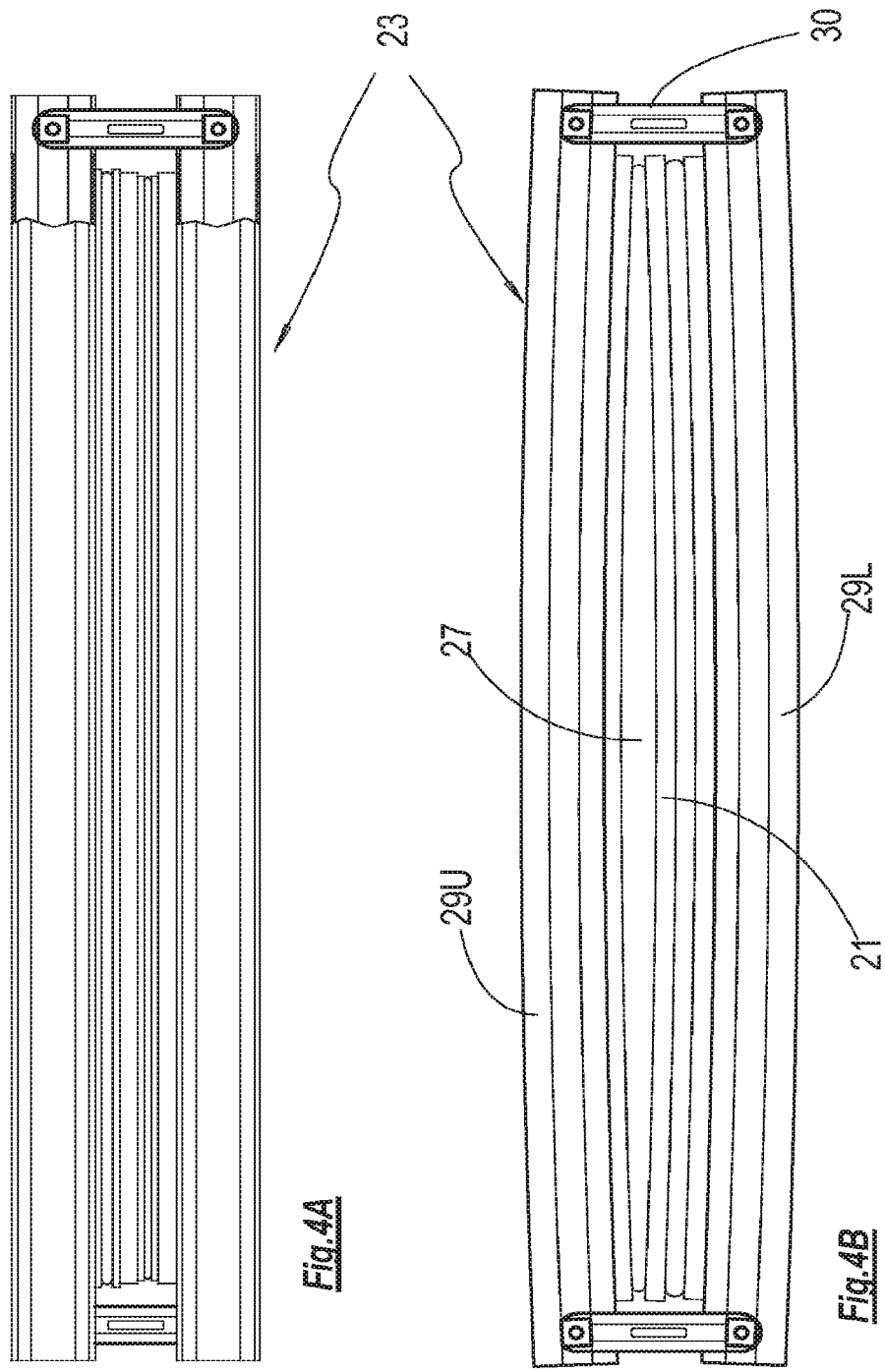

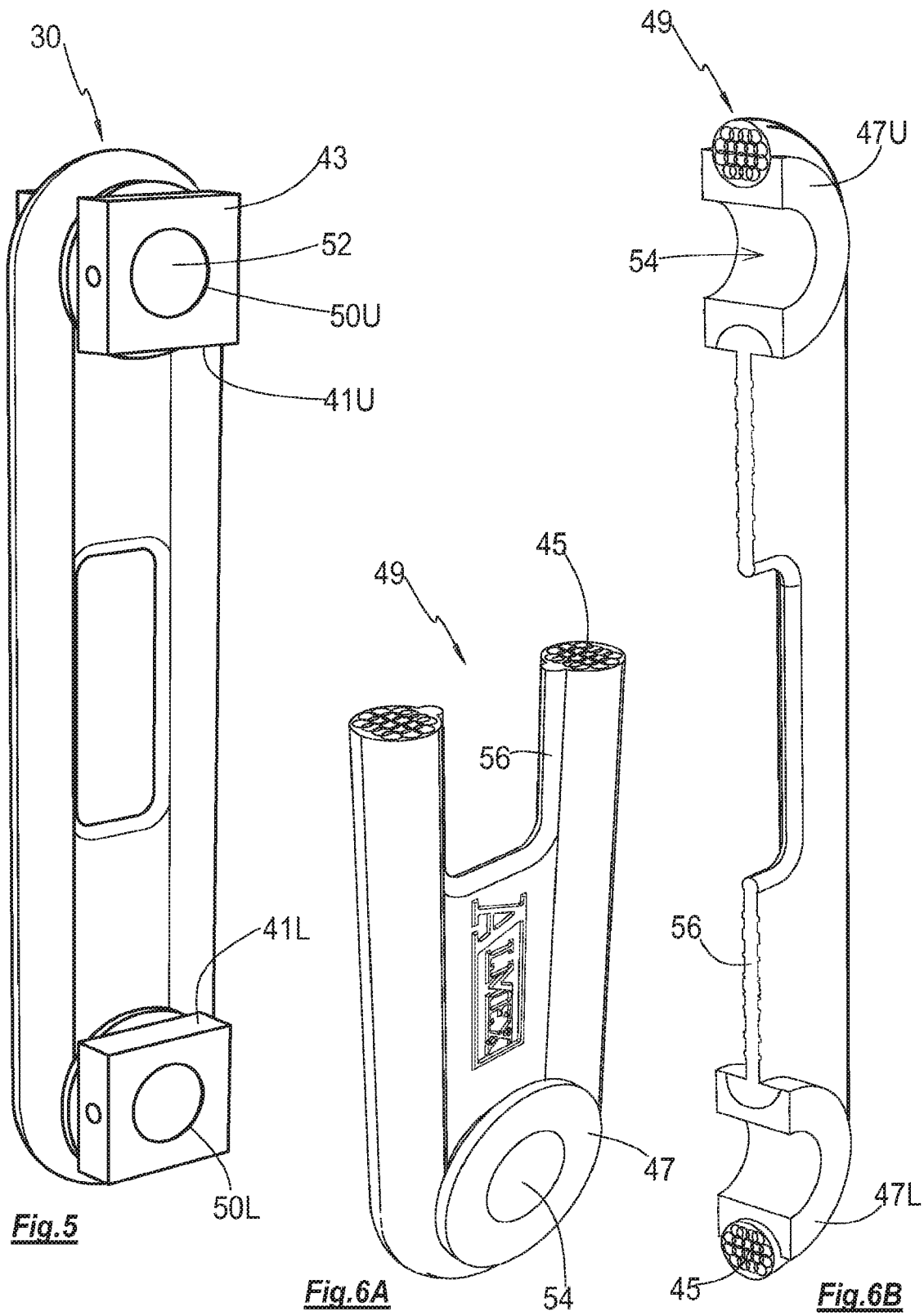

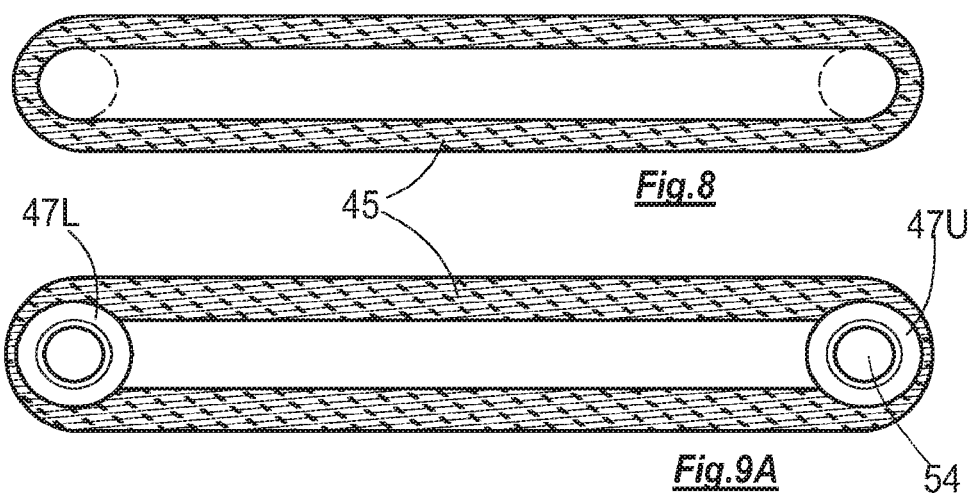
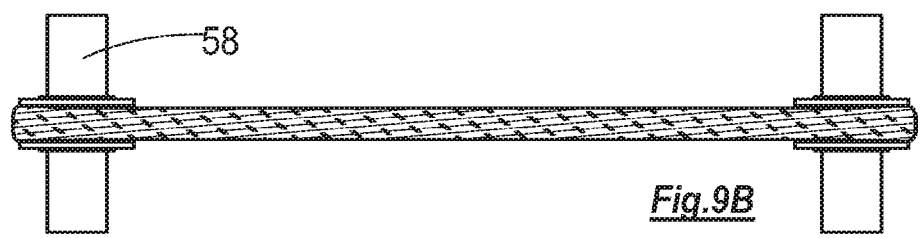
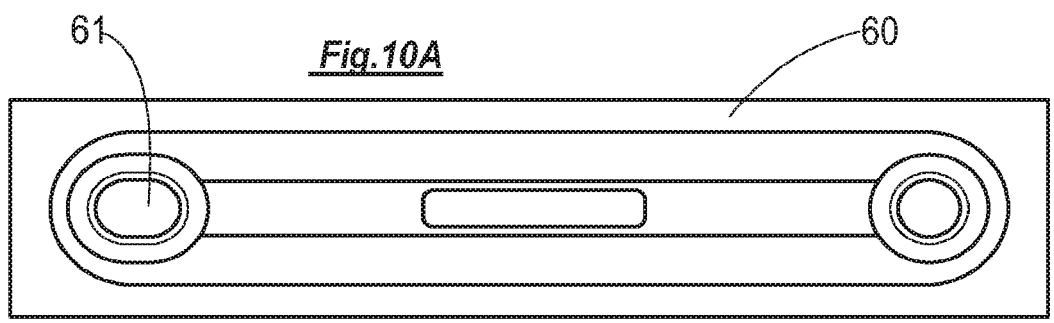

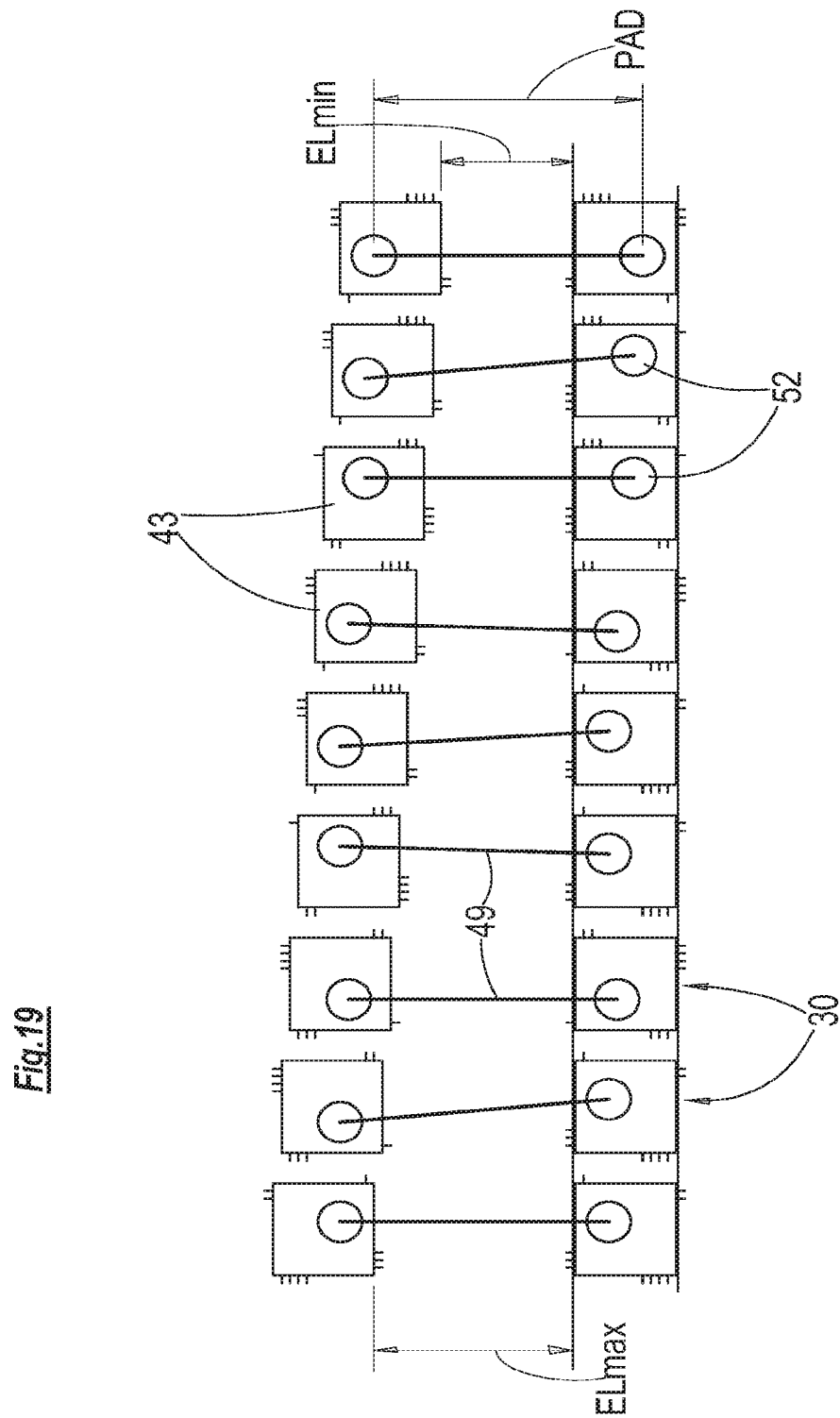

BELT SPLICER

This is a divisional application of Ser. No. 14/009,595 which is derived from PCT/CA2012/000334 anc claims priority from GB-1105764.3, filed 4 Apr. 2011.

This technology relates to belt splicers of the kind disclosed in patent publication U.S. Pat. No. 7,325,580 (February 2008, Woolner+).

In a belt-splicer, the two ends of the belt that are to be spliced are brought together in an overlapping relationship, and appropriate adhesive is applied. Generally, the adhesive has to be vulcanized under conditions of heat and pressure. The belt-splicer includes an operable pressure pad for exerting pressure on the joint, and includes a heater for heating the joint.

The pressure pad structure traditionally includes an inflatable bag. The bag is inflated with fluid. The fluid is air, for pressures up to about six atmospheres, and a liquid at higher pressures. Often, only one bag is provided, but two bags—one above the belt and one below—are sometimes used. Generally, two heaters are provided, one above and one below the belt (i.e the joint between the two ends of the belt).

A conventional belt-splicer includes an upper beam, or an upper set of beams, and includes a lower beam, or lower set of beams. The lengths of the beams span across the width of the belt, above and below. The beams are long enough such that the ends of the beams protrude out beyond the width of the belt.

The beams are arranged in pairs, the pair comprising one upper beam and one lower beam. Left and right tension-links are provided in respect of each pair of beams, and the links extend vertically between the respective ends of the beams. The pressure exerted by the inflatable bag, which urges the beams apart, is reacted by tension in the links.

The traditional tension-link has been in the form of a metal rod, having threads of opposite hands on the ends, and respective oppositely-handed threaded nuts. The nuts engage slots in the ends of the beams. The tension-link can be adjusted for length by rotating the rod, as in a turnbuckle.

The tension-links must not be allowed to fail due to the tensile force. The force in each link is typically ten or fifteen tonnes, and the link must be designed to support the force, with an adequate safety margin.

One of the problems facing the designer, when specifying the safety margin, is that the links do suffer abuse. The operation of belt-splicing is carried out in the field, often out in the open, and often at locations that involve climbing ladders, etc. The result is that the beams and the links are subjected to many different and unpredictable abuses, due—not so much to over-stressing, in operation, but rather—to violent knocks and similar other abuse, during transport of the equipment to the splicing site, and during handling at the site.

As an illustration of the unpredictable nature of the abuse suffered by the links, it is not unknown for the traditional rod-and-nuts link to be used as a handy sledge-hammer. Also, in many cases, the abuse can be habitual and on-going, and it often happens that the fact of the abuse is not recorded. Also, often, although the abuse often does leave marks, there is no indication whether the abuse has been bad enough to call into question the continuing integrity of the link. The abused link is simply used, and then put back into storage, ready for re-use.

One consequence of this habitual and on-going abuse, over a period of time, has been that the links can start to develop cracks. The high tensile stress during operation exacerbates the cracks, and it has not been unknown for the links to fail. It is also not unknown for the links to fail while being subjected to tensile forces that are significantly below the designed-for force. It may be noted that the said U.S. Pat. No. 7,325,580 was concerned, not with preventing the links from failing, but with minimizing the consequences that arise from the failure.

In most engineering applications, a problem of premature failure of a tensile link can be addressed simply by increasing the tensile capacity of the link. In this case, however, the problem cannot be addressed that way. (Of course, increasing the load capacity does no harm—except that it wastefully increases the resources needed to produce the link.)

Rather, what is required is to provide the link with an ability to resist violently-abusive damage, and—even more importantly—to provide the link with the ability to show when it has been damaged. That is to say, it is important, if the link looks undamaged, that the link should actually be undamaged, i.e that the link has not suffered damage of such nature and magnitude as to affect its integrity. The corollary—that, if the link does show visible signs of damage, that the link actually is damaged—is less important, in that it is a simple matter to instigate a program under which, if the link shows visible damage of any kind, it must be discarded—much the same as is done with wire-rope slings, for the same reason.

It is important to note also that the person who makes the assessment of the fact of, or extent of, damage to the link, on a day-by-day basis, is the splicer-operator, or the storekeeper, rather than a professional safety officer. The mark left by damaging abuse should be "unmistakeable" in this context.

Another problem associated with the traditional metal rod-and-nuts link used in belt-splicers, is the weight of the links. Such links can weigh 20 lbs or more, each. The fact is that belt-splicers often have to be deployed in such locations and circumstances that all the components of the belt-splicer have to be carried, by hand, up a ladder. While this is accepted as a fact of life, designers of belt-splicers are under constant pressure to make the components lighter, and easier to handle.

It is also the case that, when an operator is carrying things, and is on a ladder, they should at all times have one hand free, to hold onto the ladder or other support. Again, designers have to bear this requirement in mind.

Some of the components of a splicer are heavy but easy to hold and to carry; some components are light but awkward to carry. The beams, for example, typically are formed as aluminum extrusions, and are of such shape that one beam can easily be picked up and carried, even though large and bulky. The rod-and-nuts links, however, are heavy and awkward to carry. Basically, an operator can only carry one link at a time, up a ladder. Thus, often, many journeys are needed to transport all the components of the belt-splicer to the job site.

A first aspect of the present technology concerns a plastic covering for a tension-link, the tension link that is used for linking the ends of the transverse beams together, in a belt-splicer, is encased or encapsulated in a protective covering of a soft plastic material, such as polyurethane. The plastic covering is arranged in such manner that, if the plastic has the visible appearance of being undamaged, the link itself must inevitably be undamaged (in the sense of still retaining its tension-supporting integrity and its designed safety margin).

Thus, if the plastic covering has a visible cut or slit, for example, that fact is immediately apparent to even a casual operator or storekeeper, and it is a non-debatable decision on that person's part, to discard every such link. By contrast, if it were the case that the operator had to make a judgment verdict whether this or that mark or contusion of the plastic is or is not damaging, that would not be satisfactory. But it can confidently be left to operators and storekeepers to make the determination, for example, whether, or not, there is an actual incision in the plastic.

In the case of a plastic covering, if the plastic (even though marked and bruised) is intact and unbroken, that condition indicates that the load-carrying structure of the link has not been compromised—with sufficient confidence that the link can be passed for re-use. Only if the plastic is cut or broken is there a chance that the load-carrying structure might be compromised.

It may be noted that this favourable no-false-positives situation does not arise in the case of other kinds of load-carrying member, if the manner in which the member is abused is simple overloading. In the special case where the load-carrying member is a tension-link in a belt-splicer, the links are very rarely subjected to simple overload. Traditionally, belt-splicer links have been the subject of failures at loads below their theoretical capacity—but the cause is damage arising from abusive handling, not damage arising from excessive loads.

Thus, plastic encapsulation of the link, as a way of ensuring the load-carrying integrity of the link, is especially advantageous in the case of a tension-link for a belt-splicer.

An incision in a plastic covering, is hugely more visibly apparent than even a large (and highly dangerous) crack in the traditional steel rod-and-nuts link. Such a crack, if present, inevitably lies hidden among the screw-threads.

It may be noted that a plastic-encapsulated link is very much less likely to be used as a sledge hammer than the traditional metal rod-and-nuts link—which does at least have a hard heavy head and a rudimentary shaft.

When the link is encapsulated in plastic, it is a simple matter to configure the moulded plastic so as to form a handle, thus simplifying the task of carrying the links up ladders, etc. Also, different sizes, or different load-capacities, etc, of link can be very clearly differentiated, simply by using different colours of plastic.

Preferably, the plastic covering should be so configured that the plastic is not exposed to the heavy tensile forces that are to be supported by the link. Thus, the link (comprising the tension-supporting structure and the plastic covering) should be so configured as to leave metal surfaces exposed, through which the forces from the beams are actually fed into the link. In other words, the plastic material should not, itself, be in the load-line.

Preferably, the plastic-encapsulated link should be adjustable as to its length, for the same reasons as the traditional rod-and-nuts link is adjustable. Conveyor belts that have to be spliced are of different thicknesses; and the aggregate thicknesses of the associated equipment (inflation bags, heaters, platens, etc) is not always the same.

Preferably, the tension-supporting structure of the link is in the form of an endless loop of rope. The fibres forming the rope can be metal. However, preferably, the fibres are of a strong but light non-metal such as KEVLAR (trademark), poly paraphenylene terephthalamide. As described herein, the rope is in the form of an endless loop, preferably running-track shaped. Preferably, the fibres are not e.g wound around in a circle and then bent to the running-track shape, but the loop is actually manufactured in the running-track shape.

One of the benefits of using the synthetic rope-loop lies in its failure mode. If the rope-link were to be overstressed (in tension), the rope tends to yield and stretch, whereby the rope-link does not suddenly let go. By contrast, the conventional rod-and-nuts links, when they failed, fractured suddenly. This could be very dangerous, because a good deal of potential energy is stored in the pressurized air bags, and this energy could be released suddenly upon failure of the bolts.

The plastic encapsulation of the rope-loop protects the rope very effectively against knocks, contusions, abrasions, cuts, and the like. It should be understood that nearly all the abuse to which the links are subject comes during storage-handling and transport-handling, when the link is under no load, rather than during actual load-supporting operation.

It is recognized that the moulded plastic encapsulates all the vulnerable parts of the tension-link unit, but yet the plastic does not lie in the path or load-line of any of the heavy forces. The plastic can be damaged by knocks, but it is thick enough to shrug off almost all abuse, apart from cuts to the plastic, which could go right through and damage the fibres of the rope inside.

It is recognized that if the plastic is damaged enough that the rope is or might be compromised, that fact is obvious to an observer.

Preferably, the fixed length of the tension-link, being the distance apart of the upper and lower load-receiving metal surfaces, is not less than 20 cm and not more than 70 cm. Less than 20 cm, the link would be too small for handling to be a problem whatever its structure; above 70 cm, handling will be a great problem whatever its structure.

A second aspect of the technology concerns a tension-link unit which includes couplings that include a capability to pivot.

The rod-and-nuts links of U.S. Pat. No. 7,325,580 could be overstressed as a result of the rotation of the ends of the beam as the beam underwent bending deflection. The link as described provides a coupling that allows pivoting at the joint between the link and the beam. Thus, the described link itself is not subjected to a bending moment, as was the rod-and-nuts link.

The tension-link unit, as described herein, is stressed only in tension, during operation. The described link is also significantly stronger than the conventional links of comparable size. The described links are typically less than a quarter of the weight of the conventional links.

In the designs described herein, the tension-link is not pivoted directly into the beam. Rather, the tension-link pivots directly relative to the cheek-block of the coupling, and the coupling slides into the beam. The tension-link has to be assembled and disassembled from the beams, every job, and its easier to make that possible by using a slide-in block, than by a design that requires operators to make/break the pivot joint. Besides, preferably the beam is an extrusion, which lends itself to slide-in shapes. Also, the cheek-block, with its flat sides, spreads out the heavy force between the beam and the tension-link over a large area of the (soft) aluminum of the beam, and it would be difficult to provide a comparable load-bearing area at a pivoting joint.

LIST OF DRAWINGS, AND DESCRIPTION OF PREFERRED EMBODIMENTS

The technology will now be further described with reference to the accompanying drawings, in which.

Figure 3:
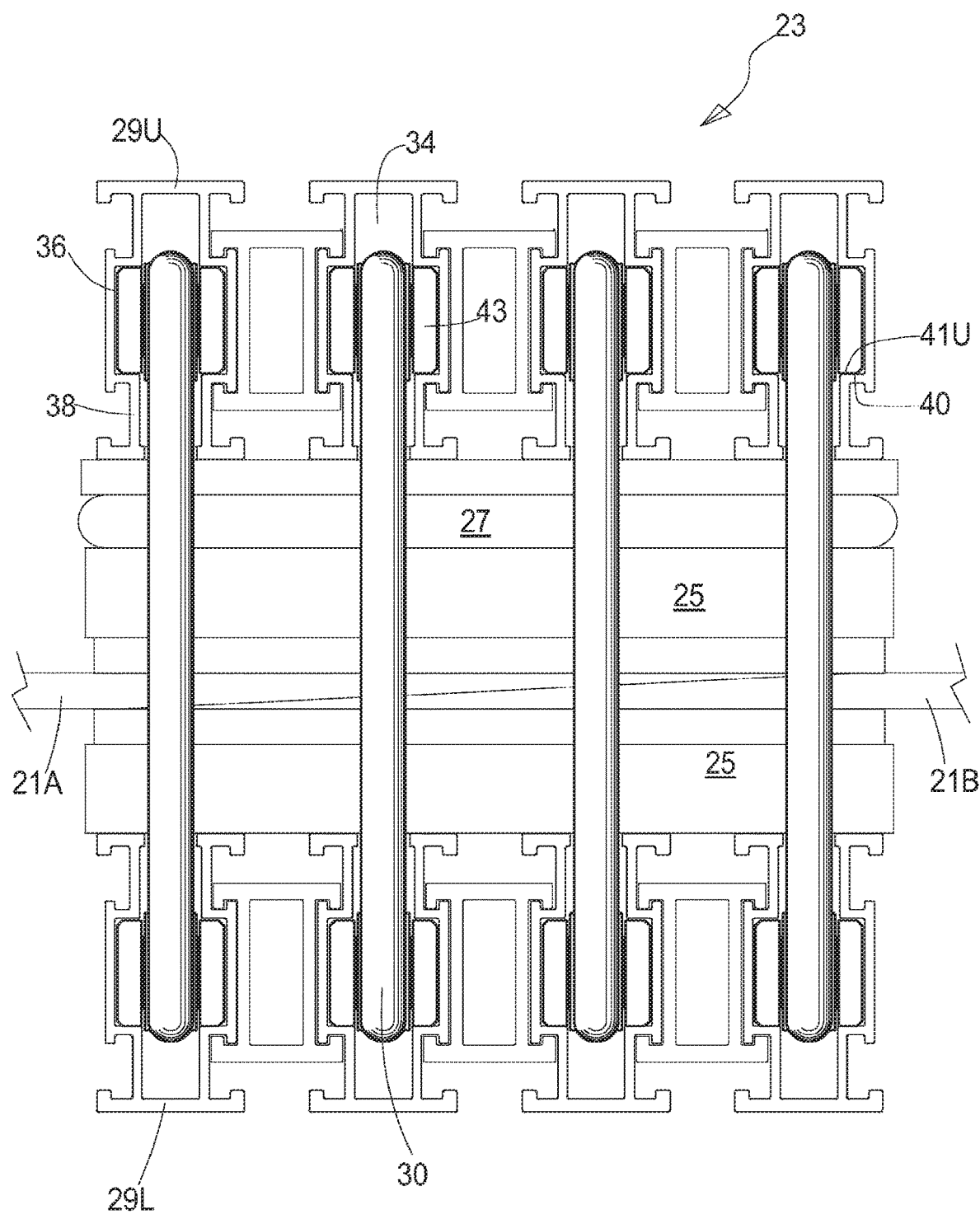

FIG. 3 is an end elevation of a belt-splicer, showing the manner in which the tension-link units interact with pairs of beams. In FIG. 3, spacers have been provided between the beams, which perform the functions described in the said U.S. Pat. No. 7,325,580.

FIG. 4a is a front elevation that shows a belt-splicer assembled in place onto the belt.

FIG. 4b is the same view as FIG. 4a, except that now the pressure pad has been energized, exerting a large compression pressure on the joint in the belt. The upper and lower beams have deflected in bending mode, whereby the ends of the beams have undergone rotation. The couplings of the tension-link units have pivoted correspondingly.

FIG. 5 is a pictorial view of a tension-link unit, which includes a tension-link and upper and lower pairs of attached pivoting couplings, by which the tension-link interacts with the upper and lower beams.

FIGS. 6a,6b are pictorial sectioned cut-away views, showing the structure of the tension-link.

Figure 7:
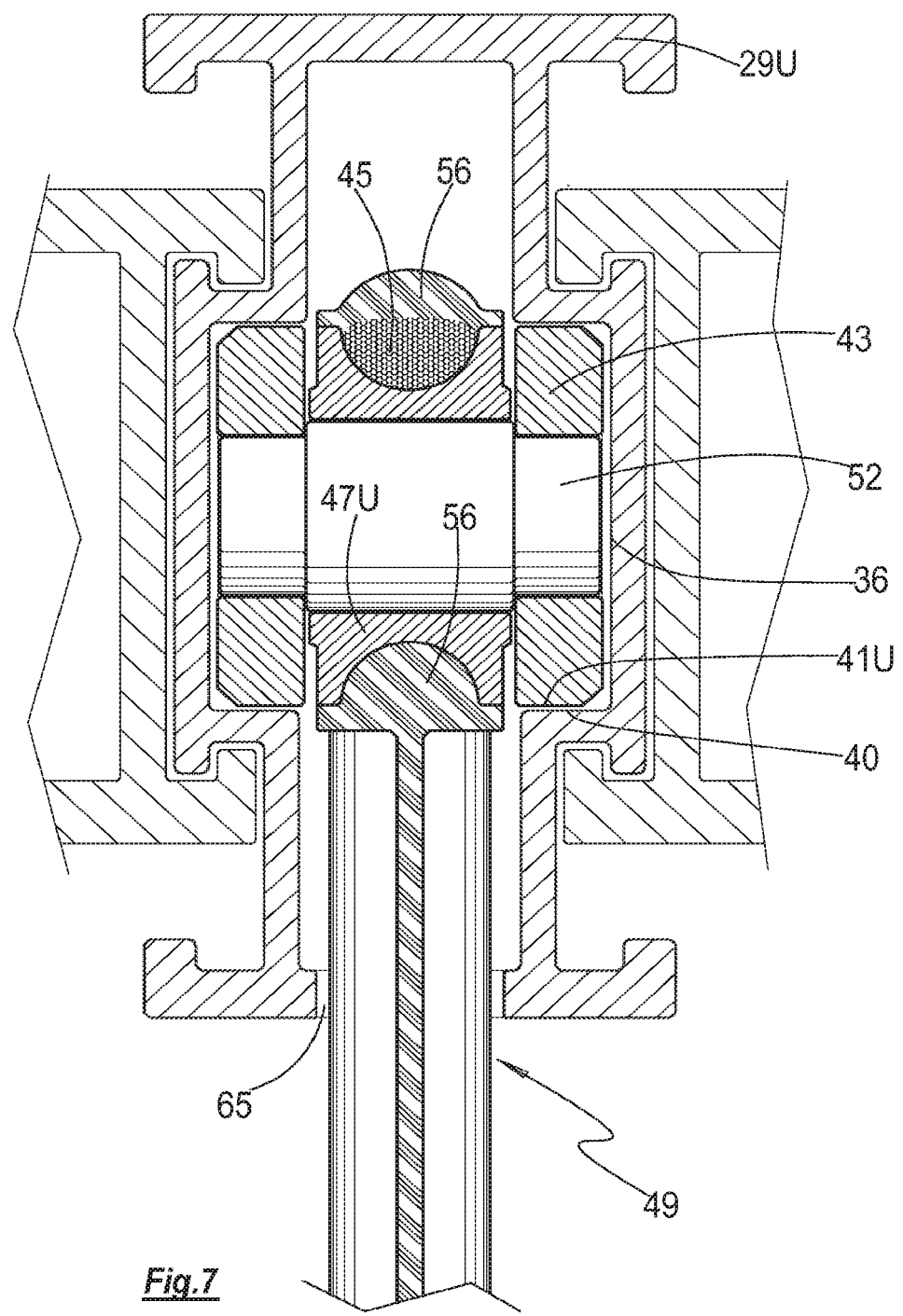

FIG. 7 is a close-up, sectioned side-view, showing some details of the tension-link unit, and of its interaction with one of the beams.

FIG. 8 is a plan view of a rope that has been formed into a running-track-shaped endless-loop, the fibres of the rope having been wound round spaced formers.

FIGS. 9a,9b show a tension-member, comprising the endless-loop of rope shown in FIG. 8 and two bosses that have been assembled into the rope.

FIGS. 10a,10b are a plan view and a sectioned side-view of a mould-half, in which the plastic encapsulation is to be carried out.

Figure 11A:
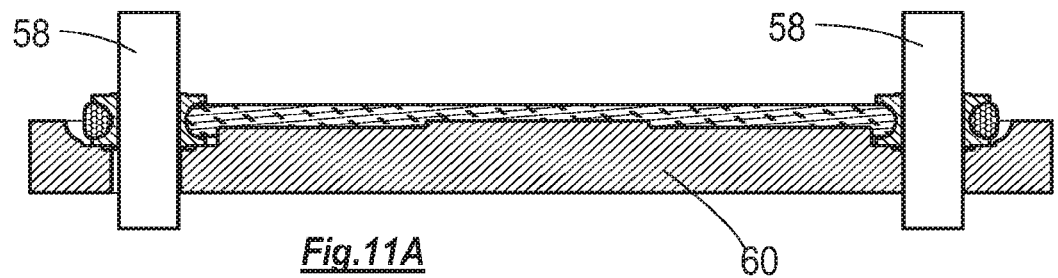
Figure 11B:
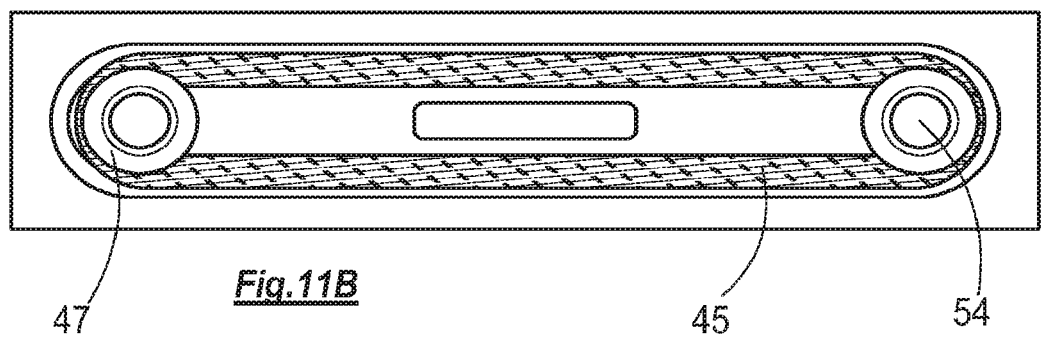

FIGS. 11a,11b are a plan view and a sectioned side-view of the mould-half, into which the tension-member shown in FIGS. 9a,9b has been placed.

Figure 12A:
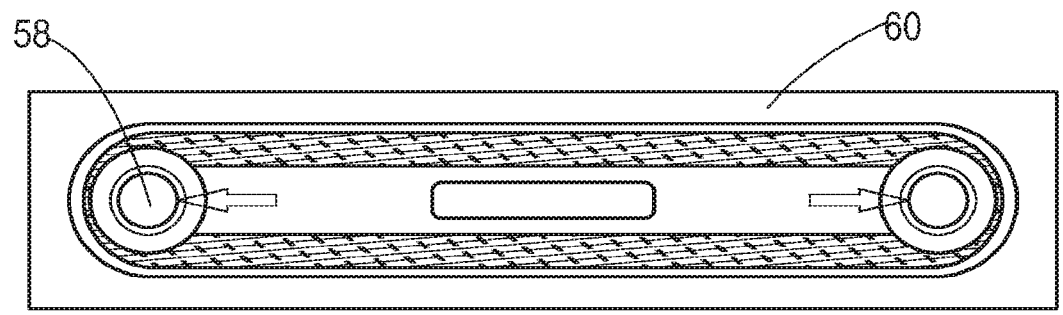

FIG. 12a is the same as FIG. 11a, except that, now, mandrels placed in the bosses are being forced apart. This produces tension in the fibres of the rope.

Figure 12B:
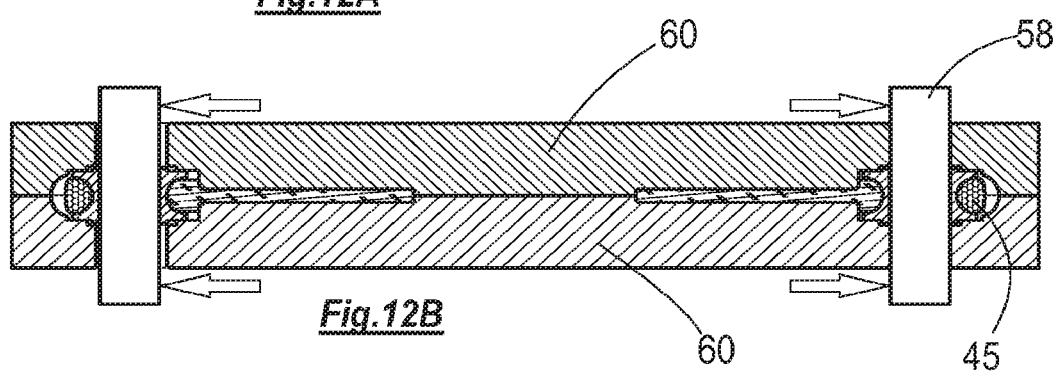

FIG. 12b is a sectioned side-view corresponding to FIG. 12a, except that the other half of the mould is now included.

Figure 13:
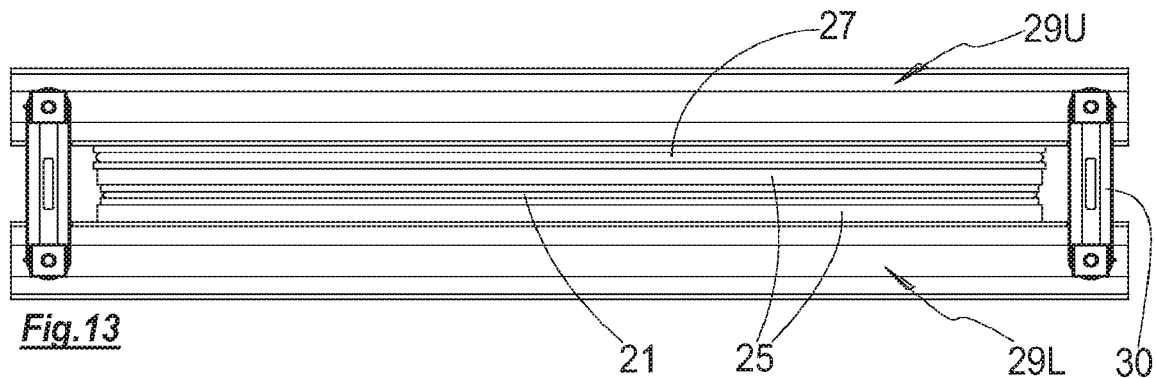

FIG. 13 is a front elevation of a portion of a belt-splicer that is to be dismantled. The left and right tension-link units are in place, operationally engaged in the ends of the upper and lower beams.

Figure 13A:
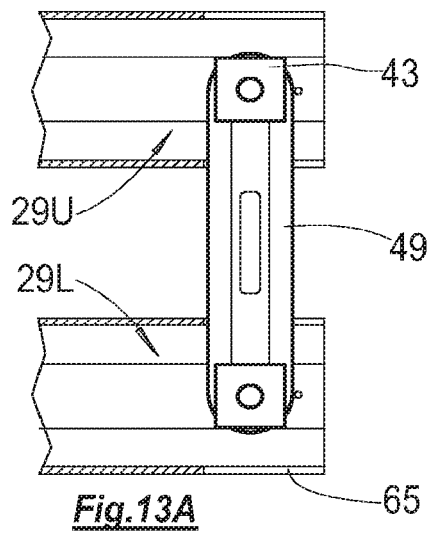

FIG. 13a is the same view, but shows only the ends of the beams.

Figure 14:
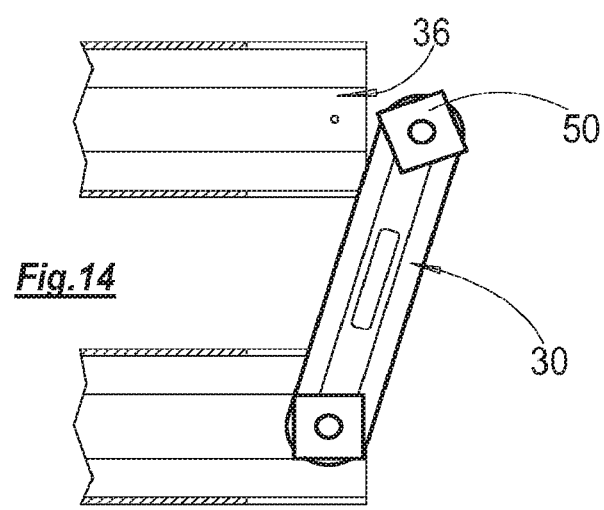

FIG. 14 shows the situation when the upper coupling of the tension-link unit has been slid out of the slots in the upper beam. The unit has been rotated about the pivot axis of the lower coupling, and lies at an angle to the vertical, and the lower coupling is still engaged with the lower beam.

Figure 15:
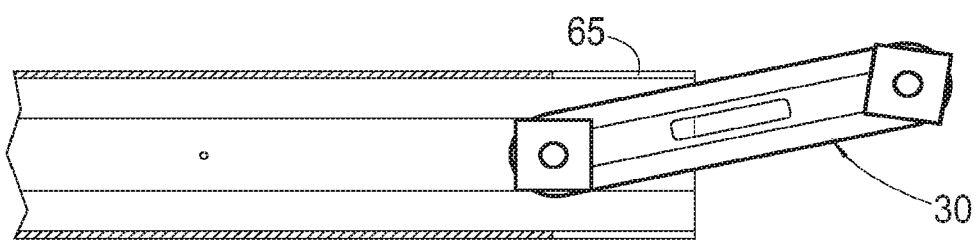

FIG. 15 shows the situation when the unit has been pivoted some more, about the lower pivot axis.

Figure 16:
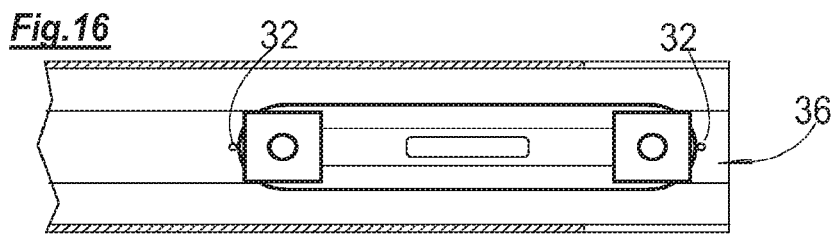

FIG. 16 shows the angle of the tension-link now aligned with the length of the lower beam. Now, the lower coupling has been slid further into the lower beam. The tension-link and the upper coupling also have followed the lower coupling into the hollow interior of the lower beam.

Figure 17:
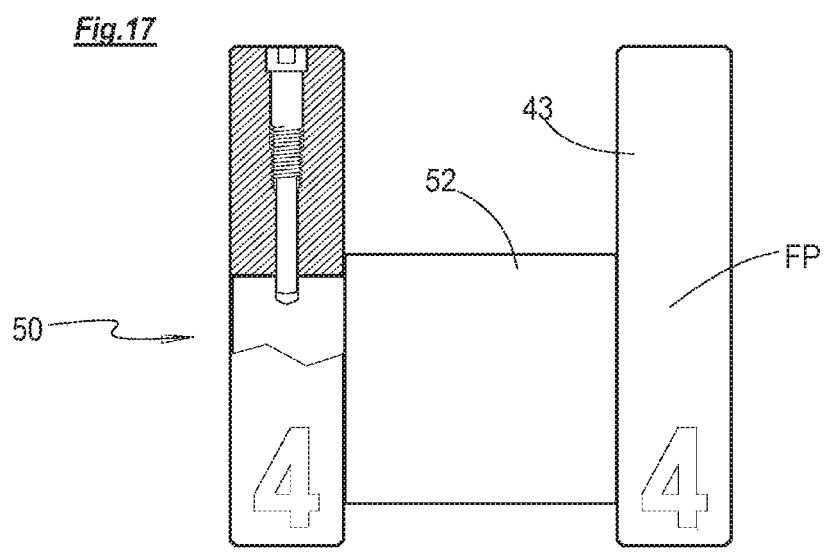

FIG. 17 is a part-sectioned side-view of a pivot-pin and a pair of cheek-blocks of a tension-link unit.

Figure 18:
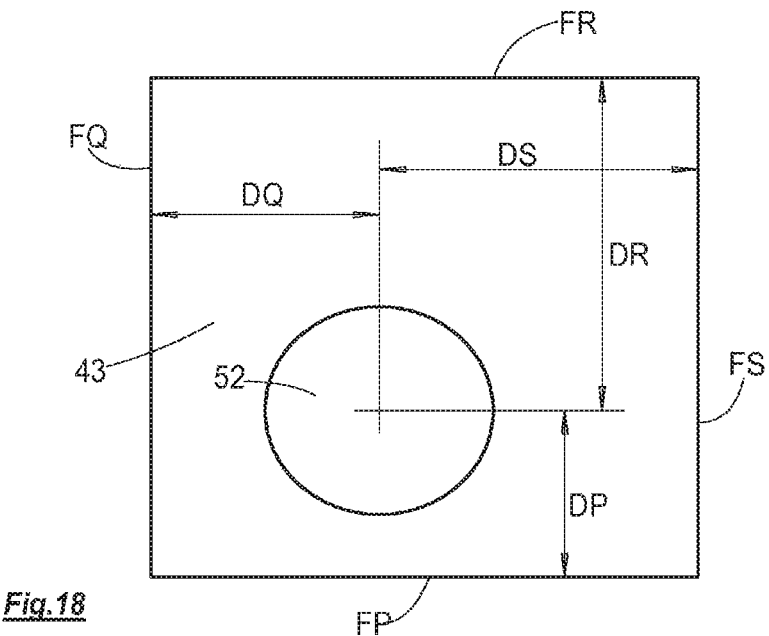

FIG. 18 shows the same structure in front elevation, and shows the eccentric location of the position of the pivot axis in the cheek-block.

FIG. 19 is a diagram that shows the various configurations into which the couplings of the tension-link unit can be rotated, thereby enabling the distance between the cheek-blocks of the tension-link unit to be adjusted.

The scope of the patent protection sought herein is defined by the accompanying claims. The apparatuses and procedures shown in the accompanying drawings and described herein are examples.

Some of the physical features of the apparatuses depicted herein have been depicted in just one apparatus. That is to say, not all options have been depicted of all the variants. Skilled designers should understand the intent that depicted features can be included or substituted optionally in others of the depicted apparatuses, where that is possible.

Some of the components and features in the drawings have been given numerals with letter suffixes, which indicate upper/lower etc versions of the components. The numeral without the suffix has been used herein to indicate the components generically.

Terms of orientation (e.g "upper/lower", "left/right", and the like) when used herein are intended to be construed as follows. The terms being applied to a device, that device is distinguished by the terms of orientation only if there is not one single orientation into which the device, or an image (including a mirror image) of the device, could be placed, in which the terms could be applied consistently.

Terms used herein that define respective theoretical constructs, are intended to be construed according to the purposive construction.

Figure 2:
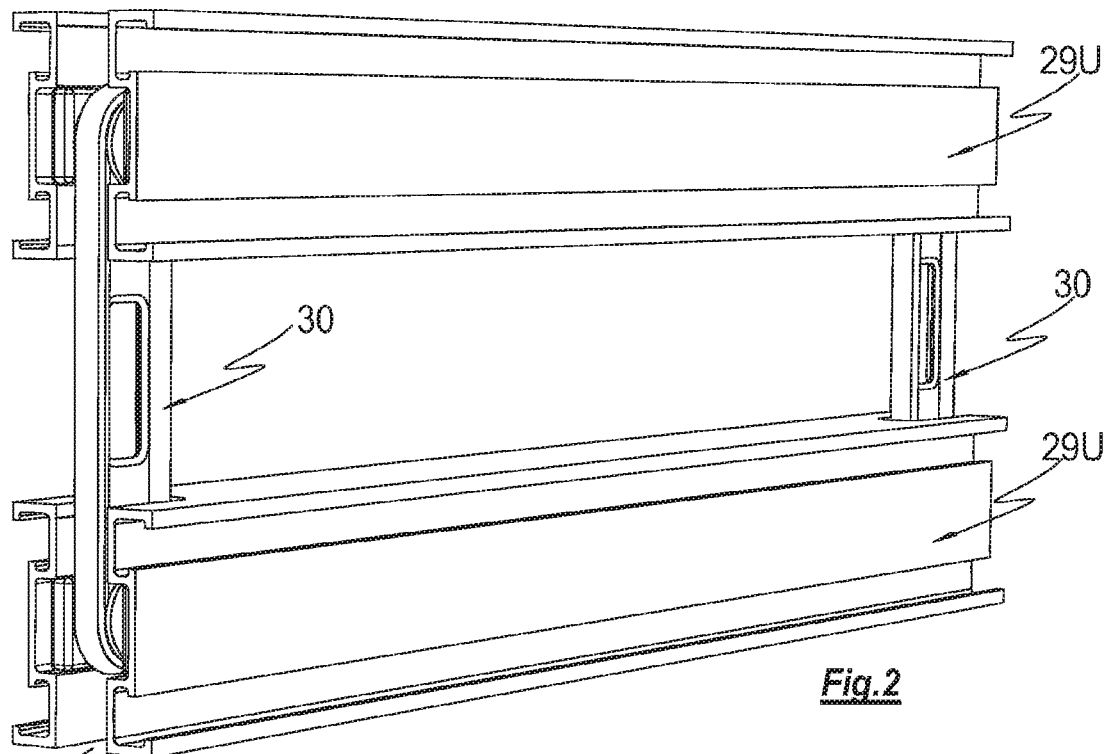
FIG. 2 is a similar view of a belt-splicer that has just a single-pair of beams. The belt to be spliced, and the heaters, pressure pads, etc, have been omitted from this drawing.
Figure 1:
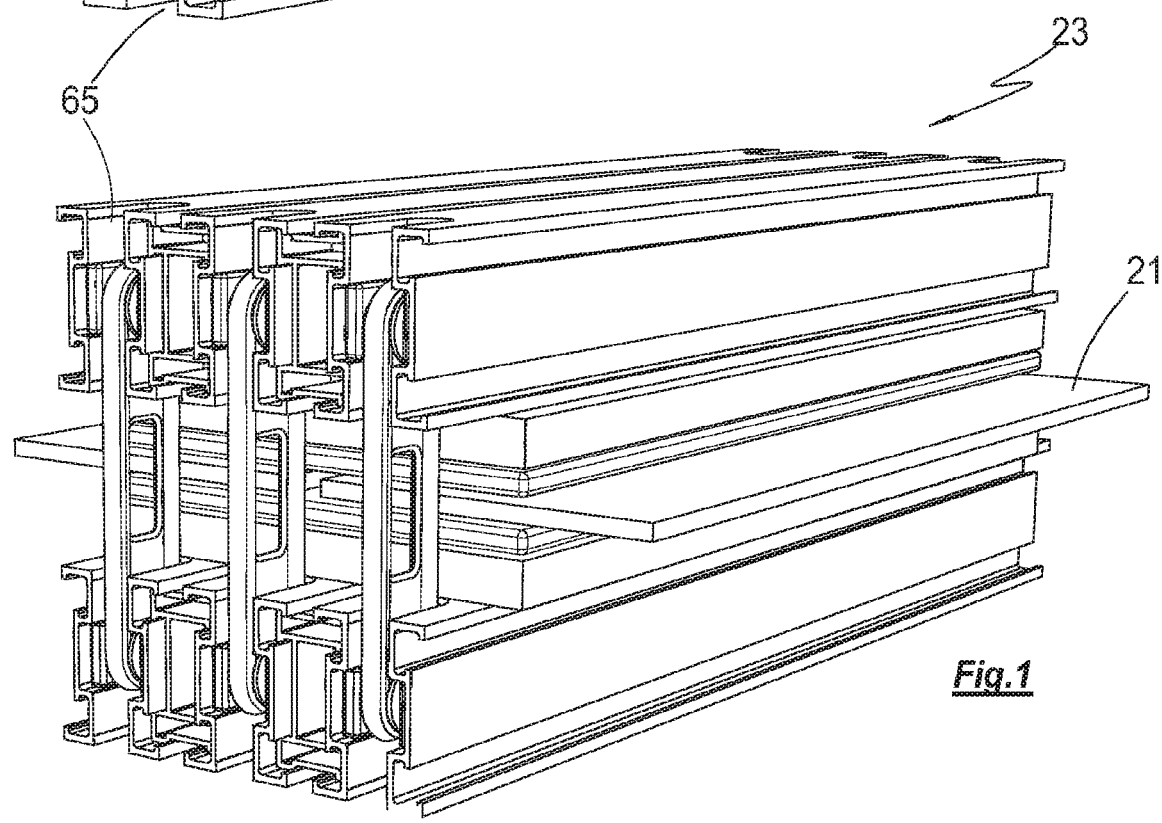
FIG. 1 is a pictorial view of a belt-splicer. This design uses three pairs of beams, which are linked together at their ends with plastic-encapsulated tension links.

FIG. 1 shows two ends 21a,21b of a belt, which are to be spliced together. The belt-splicer 23 includes heater/cooler platens 25U,25L, and also pressurizable airbags or pressure pads 27. To splice the two ends of the belt together, suitable adhesive is applied to the joint, then the pressure-pads are energized to press the ends together, and heat is applied. The heat and pressure are maintained for a period of time, in order to vulcanize/cure the adhesive.

When carrying out a splicing operation, typically all the components of the belt-splicer must be taken to the site where the splice is to be made. Often, this has to be done by hand. Often, climbing of ladders, while carrying the components, is involved. Therefore, the components should be light and easy to carry. The designers should have it in mind that the components will be dropped and knocked, and otherwise abused, and therefore general robustness is desirable. The components should be light enough to be man-handled into position, and should be easy to assemble and disassemble. Of course, the use of tools is not ruled out, but the fewer tools, nuts and bolts, etc, and the like, that have to be carried to the splice site, the better.

The present technology is concerned with the interactions between the beams, being the upper and lower beams 29U,29L that span across the belt 21, with the tension-link units 30 that link the ends of the beams 29 together. In the drawings, in preparation for splicing, the beams 29 are manoeuvred into place above and below the belt 21, and the tension-link units 30 are engaged into the ends of the beams. Stop-pins 32 (see e.g FIG. 13a) are used to keep the tension-link units 30 in their proper places, in the ends of the beams, once assembled.

The beams 29 are formed as aluminum extrusions. The extruded profile of the beam defines an enclosed hollow space 34. The space 34 includes recesses or slots 36 in the side-walls 38 of the beam. The slots 36 are formed with respective force-transmitting surfaces 40—being the surfaces at the bottoms of the slots 36 in the case of the upper beams 29U, and the surfaces at the tops of the slots 36 in the case of the lower beams 29L. The force-transmitting surfaces 40 are the surfaces that make forceful contact with the engagement-faces 41 of the tension-link units 30, when the pressure pad 27 is energized, and the tension-link units are performing their role of holding the upper and lower beams 29U,29L together.

FIG. 4a shows the assembled belt-splicer 23, with the ends 21a,b of the belt having been prepared, and adhesive applied, and the splicer now ready for the pressure pad 27 to be inflated. FIG. 4b shows the pressure pad having been inflated. Now the upper and lower beams 29U,29L have deflected in bending; this has caused the ends of the beams to rotate through an angle. The tension-link units 30 are provided with pivotable cheek-blocks 43, which can pivot and so follow the rotations of the ends of the beam, thereby preventing any perverse bending moments from being transmitted to the tension-link units 30.

In the belt-splicers that used the traditional rod-and-nuts tension-links (see U.S. Pat. No. 7,325,580), the links, there, were indeed subjected to perverse bending moments that were induced by the rotation of the ends of the beam as the beams bent under load. The elimination of such bending moments in the present tension-links is considered a significant safeguard against premature failure.

The structure of the tension-link unit 30 is shown in FIGS. 5-7. The tensile strength of the tension-link unit 30, from the standpoint of supporting the forces tending to separate the beams 29U,29L, is determined by an endless-loop 45 of rope, which passes round upper and lower bosses 47U,47L. The bosses 47 are shaped like pulleys; it is stressed, however, that the bosses 47 are not intended to rotate, or to undergo any motion at all, relative to rope 45.

The sub-assembly shown in FIG. 5 is referred to herein as a tension-link unit, designated 30. The device shown in FIGS. 6a,6b is referred to herein as a tension-link, designated 49. The tension-link unit 30 in FIG. 5 comprises the tension-link 49 and two couplings 50. The coupling 50 comprises the boss 47 and the pivot-pin 52. The pivot-pin 52 engages a through-hole 54 in the boss 47.

The pivot-pin 52 also carries the cheek-blocks 43. In the illustrated structure, the cheek-blocks 43 are used in pairs; both cheek-blocks of the pair are locked to the pivot-pin, such that both cheek-blocks are forced to rotate in unison with the pivot-pin.

(Preferably, the cheek-blocks 43 should not be locked tightly to the pivot-pin 52. In FIG. 17, for example, the grub-screw 56 is tightened into the cheek-block, but is a loose fit in its recess in the pivot-pin 52. The heavy tensile forces that are applied to the tension-link unit 30 pass through the interface between the pivot-pin 52 and the through-hole 54, and the mentioned looseness permits the pivot-pin to "settle into" the through-hole 54 in the block 43, under this heavy force, whatever the rotational orientation of the pivot-pin+cheek-blocks relative to the boss 47.)

The tension-link 49, as shown in FIG. 5, comprises the endless-loop 45 of rope, the two bosses 47U,47L, and a plastic covering 56. The loop 45 of rope passes around the upper and lower bosses 47U,47L, whereby the loop is running-track-shaped, comprising two semi-circular runs connected by two straight runs.

It is recognized that the plastic covering does not tend to break free from, and become detached from, the fibres of the rope, under heavy loading of the tension-link. Although the rope does stretch under heavy tension, the plastic is pliable enough to follow the motion, and "breaking free" is not a problem. In this regard, preferably the rope should be under an applied tension while the liquid plastic is being poured over and around the rope, during moulding, and during curing of the plastic.

It is recognized that that applied tension, during moulding, need not be the full maximum tension for which the tension-link is rated; but the applied tension should be enough at least to take up the slack in the rope and in the fibres, so that at the moment the fibres are encapsulated, the fibres are, more or less, in the positions they will be in when the heavy force comes on. It is recognized that any slight further movements of the fibres relative to each other, as between the slack-taken-up condition and the fully-loaded condition, are small enough not to affect the integrity of the moulded bond between the fibres and the plastic covering.

In the straight-runs of the endless-loop 45, the cross-sectional profile of the rope will be the rope's own inherent shape. However, in the semi-circular-runs, over the bosses 47, the profile of the rope will follow the profile of the groove provided in the outer surface of the boss 47. In FIG. 7, the groove has a round circular profile. Thus, the fibres of the rope, as they go over the boss, press deeply into this groove, and adopt the shape of the groove.

The endless loop of rope is prepared by winding the fibres over the bosses (or over formers that duplicate the profile of the bosses), whereby the cross-sectional profile or shape of the rope, as it passes over the boss, is as shown in FIG. 7. It should be understood that, in FIG. 7, the loop of rope has been done in such a way that the fibres are not bent over the boss after the rope was formed—which would have caused the outer fibres of the profile of the rope to be tight, and the inner fibres to be slack. Rather, when the rope was being formed to the shape shown in FIG. 7, the rope was wound under tension. Thus, all the fibres, in all locations in the profile, are—at least notionally—under the same tension. (By contrast, usually when a loop of rope is bent over a pulley, under tension, of course the outer fibres of the rope are then under much more tension than the inner fibres.)

The groove in the boss 47 is circular, but the mentioned condition—that all the fibres are under the same tension—applies whatever the profile of the groove in the boss, provided the rope has been formed by winding the fibres around the two bosses, under tension. That is to say: this manner of forming the rope leaves each fibre the length it needs to be, to be at the same tension as the other fibres.

The groove should be a channel that has side-walls high enough to contain all the fibres, and the groove surface should be smooth and well radiused, but, apart from that, the grooves might be e.g flat-bottomed, or any shape.

It is not required that the groove in the upper boss 47U be the same shape as the groove in the lower boss 47L, although same-shape is preferred. It is not essential that the semi-circular runs be strictly of a constant radius; however, constant-radius-circular is preferred.

It may be noted that the bosses 47 are not fixed or locked to the loop 45 of rope, nor to each other, nor into the tension link 49 as a sub-assembly, other than by being moulded into the plastic covering 56. Thus, if a heavy turning moment were to be applied to the boss 47, the boss would turn and the plastic covering would be damaged. It is recognized that the presence of the couplings, with their pivoting capability, isolates the bosses from all but small insignificant turning moments.

Thus it is recognized that, in the illustrated design, the bosses and the loop of rope do not need to be held in their mutual locations by anything more than the plastic covering—because the perverse forces and turning moments that might tend to move and dislodge the components happen during handling (including the inevitable rough handling), and do not happen when the tension-link is under heavy operational loading. It is recognized that the plastic covering, as described, is able to provide an excellent service life performing this (limited) role, and that the bosses need not be otherwise fixed to the loop of rope.

The manufacture of the tension-link is shown in FIGS. 8-12b. In FIG. 8, the endless-loop 45 of rope has been formed by winding the rope fibres around formers. In FIG. 9, the formers have been removed and replaced by the bosses 47U,47L—or the rope could have been formed around the bosses themselves. In FIGS. 9a,9b, mandrels 58 have been placed in the through-holes 54 in the bosses.

FIGS. 10a,10b illustrate a mould-half 60. FIGS. 11a,11b show the components of FIGS. 9a,9b now placed in the mould-half 60. The mandrels 58 protrude through right and left holes in the mould-half. It will be noted that the left-side hole is elongated. In FIGS. 12a,12b, a force has been applied to the mandrels, urging them apart, as shown by the arrows. The elongated hole means that the endless loop 45 of rope can stretch, as a result of the force applied to the mandrels 58 In FIG. 12b, the mould has been completed, and the pouring of the liquid plastic takes place while the rope is being stretched. Preferably, the tension is maintained also during curing of the plastic.

Preferably, the plastic is cold-pouring polyurethane. In-mould curing of the plastic is done in an oven set to the appropriate temperature. When the plastic material is poured, it is in liquid form. It is important, from the standpoint of the quality of the plastic that, if any air was introduced when the liquid was being prepared, such air be removed. The liquid should be de-aerated in a vacuum chamber, prior to pouring.

The mould should be so arranged that the mould seals against the side-faces of the bosses 47. Thus, there is no plastic covering over the side-faces. Also, the through-holes 54 in the bosses, which serve as load-receiving metal surfaces of the tension-link, through which is transmitted the whole tension that is supported by the tension-link, in operation, should be left free of plastic. The mould should be so arranged that, apart from those surfaces, both bosses, and the loop of rope, should be completely encapsulated by the plastic covering.

A slot can be moulded into the plastic material, to serve as a convenient handle.

Theoretically, the tension applied during moulding should be no less than the maximum tension likely to be encountered during operation. However, it has been found that, so long as the tension applied during moulding is enough to take up the slack, applying further tension during moulding has little benefit. It has been found that the first tension applied to the loop of rope, wound round the bosses, takes up the slack at a fairly low rate—that is to say, an incremental increase in force produces a large elongation of the loop. But once the slack has been taken up, the rate changes, and now an incremental increase in force produces only a tiny elongation. Thus, the tension in the loop should be enough to take up the slack.

Inevitably, when the load goes on, the fibres must undergo some movement relative to each other. However, when the fibres are wound, under tension, around formers that have the same profile and spacing as the bosses, as described, the amount of such relative movement of the fibres, during operation, is minimized. It is recognized that, if slack-take-up tension is applied to the loop of rope as the liquid plastic is poured into the mould, and during curing, there is no problem of the plastic separating from the fibres during operation.

The tension-link, as described herein, comprises the loop of rope and the two bosses, encapsulated in the moulded plastic covering. The tension-link unit comprises the tension-link, plus the upper and lower couplings. Each coupling comprises a pair of cheek-blocks, and a pivot-pin. In the tension-link unit, in respect of each coupling, the pivot pin is assembled into the through-hole in the boss, and the two cheek-blocks are locked to the pivot pin, one each side of the boss. The pair of cheek-blocks is rotatable, as a unit, with respect to the boss.

Preferably, the couplings are factory-assembled to the tension-links, whereby the tension-link units are shipped, ready-assembled, with the two pairs of cheek-blocks captively assembled to the tension-links. The cheek-blocks are assembled onto the ends of the pivot-pins, and are secured in place with grubscrews. If required, the cheek-blocks can be removed (upon slackening the grubscrews) but the intent is that they remain attached to their respective rope-links for their service lives.

FIGS. 13-16 illustrate another aspect of the invention, in which the tension-link unit is stored inside the hollow interior of the beam.

FIG. 13 shows a belt-splicer 23 that has been used to create a splice, and now needs to be dismantled, and transported back to the shop. FIG. 13a is a close-up of one end of the belt-splicer. The tension-link unit 30 is located in cut-outs 65 in the ends of the beams. (The cut-out 65 is only needed on the side of the beam that faces the other beam, but cut-outs are provided in both sides of the beam so the operator does not have to worry about the beam being the right way up.) The cut-out 65 defines how far the tension-link unit can be inserted lengthwise into the length of the beam, when the unit is oriented for operational use.

During assembly of the belt-splicer 23, stop-pins 32 were inserted in suitably-located holes in the walls of the beams, which serve to keep the unit in place during operation. It may be noted that, in operation of the belt-splicer, the tension-link unit does not engage, or does not forcefully engage, either the cut-out or the stop-pins.

Upon disassembly, the stop-pins 32 are withdrawn (FIG. 14). Now, the tension-link unit can be eased out of the end of the beam, by sliding the cheek-blocks 43 lengthwise along the slots 36 of the beams.

In the illustrated design, rather than removing the tension-link unit completely from the beams, the unit is separated from one of the beams, and is then inserted, as a unit, lengthwise into the other beam. FIG. 14 shows the upper coupling 50U of the unit being withdrawn from the upper beam 29U. The tension-link is rotated about the pivot-axis of the lower coupling 50L, in order to achieve the movements shown in FIGS. 13-16. It will be understood that the operator manipulates the unit 30 by hand, at this time.

In FIG. 15, the tension-link unit has been further rotated, and is now lying nearly flat, and nearly ready to be inserted into the hollow space 34 within the profile of the beam. In FIG. 16, this condition has been achieved. The operator orients the cheek-blocks of the upper-coupling 50U, so that the cheek-blocks will enter the slots 36 of the lower beam 29L. Then, the operator slides the whole tension-link unit lengthwise along the length of the lower beam. It will be noted that the cheek blocks of the lower coupling 50L never leave the slots 36 in the lower beam 29L, so the operator does not need to handle, or set the orientation of, the lower cheek-blocks.

With the tension-link unit now residing inside the lower beam (FIG. 16), the operator can install stop-pins in suitable pre-located holes in the beam, to keep it in place. The tension-link units of that pair of beams can be placed one in each end of one beam, or they can be placed one in each of the beams.

It will be understood that, for dis-assembly, the tension-link units are, or can be, placed into their protected storage location inside the hollow beams without even being removed from the beam. Also, this placement is done before the components even start to be removed from the job-site. Equally, for assembly, the tension-links units are not extracted from their protected chambers until the very last moment, after everything has been transported to the job-site and has been put in position. It is not possible to say that storage-and-handling damage to the tension-link units has been completely eliminated—but it is almost possible.

In order for the above-described beneficial manner of storage of the tension-link units to be engineered, of course the units have to be of a shape and size such that they will fit inside the beam. But, in this case, the units are automatically of such shape and size. The whole of the tension-link unit must fit into the hollow space—but of course it does so.

FIGS. 17-19 embody another aspect of the invention, in which eccentrically-mounted cheek-blocks provide the tension link units with a capability for adjustment. In the previous drawings, the axis of the pivot-pin 52 has been located in the centre of the cheek-block. In FIGS. 17-19, the axis of the pivot-pin is eccentrically placed in the cheek-block. This enables the tension-link unit to be adjustable as to the distance of separation of the engagement-faces of the upper and lower couplings. The distance apart of the respective engagement-faces of the upper and lower couplings may be regarded as the effective operational length of the tension-link unit. This engagement length is designated EL.

Each coupling includes a pair of cheek-blocks, which are arranged to be rotatable in unison with each other about the pivot axis of the coupling.

The cheek-block of the coupling is square, and has four faces that define its circumference. These four faces are designated FP, FQ, FR, FS. FIG. 18 shows the four different radial distances, designated DP, DQ, DR, DS, from these faces to the axis of the pivot-pin 52. DP is the shortest radius, then DQ, then DS, and DR is the longest radius. The length of the side of the square block being L, DP+DR=L, and DQ+DS=L.

The engagement-length EL of the tension-link unit can be changed/adjusted by rotating the pair of cheek-blocks of the upper coupling and/or by rotating the pair of cheek-blocks of the lower coupling. Rotating one or both couplings, relative to the length of the tension-link, changes which ones of the faces FP, FQ, FR, FS of the couplings become the engagement-faces of the couplings, and thus changes the engagement-length EL of the tension-link unit.

The engagement-face 41U of the upper coupling is whichever of the faces FP, FQ, FR, FS of the upper-coupling happens to be facing downwards. The engagement-face 41L of the lower coupling is whichever of the faces FP, FQ, FR, FS of the lower-coupling happens to be facing upwards. If/when the cheek-blocks are rotated, the distance from the engagement-face to the pivot axis changes.

The distance apart of the pivot axis of the upper coupling from the pivot-axis of the lower coupling is designated the distance PAD. The distance PAD does not change, of course, when the cheek-blocks are rotated, but remains constant. The maximum engagement-length ELmax of the tension-link unit occurs when the face FP of the upper coupling faces downwards, and the face FP of the lower coupling faces upwards. The minimum engagement-length ELmin occurs when the face FS of the upper coupling faces downwards, and the face FS of the lower coupling faces upwards. Dimensionally, ELmax=PAD−2×FS, while ELmin=PAD−2×FP.

Other combinations of orientations of the couplings provide intermediate values of the engagement-length EL. The length L of the side of the square block can be notionally divided into twelve units. A preferred placement of the pivot axis is one in which DP=4 units, DQ=5, DE=8, and DS=7 length-units.

At this, given a PAD dimension (the unchanging distance apart of the upper and lower pivot-axes of the tension-link) of e.g 100 length-units, ELmax is 100−2×4=92 length-units, while ELmin=100−2×8=84 length-units.

The seven length-unit-intervals between these two can all be created by suitably rotating the cheek-blocks, e.g in the manner as illustrated in FIG. 19.

In order to take best advantage of the adjustability provided by the eccentric blocks, preferably the operators should be given assistance in the form of visible indicia on the blocks, to indicate which orientation the blocks currently stand at, and to simplify the estimation of what rotations to perform to make a large or a small increment of adjustment to the engagement-length EL. Preferably, these indicia should go further then merely marking e.g A,B,C,D on the four faces of the blocks, and should indicate the differences in actual distance. Thus, the blocks should be marked with 4,5,7,8. Reading the marks showing on the cheek-blocks of the upper coupling, and the marks showing on the lower coupling, the operator simply adds them together, to reveal the distance by which the link unit has been shortened, given those orientations.

Thus, in FIG. 19, the mark "I" could be replaced by "4"; the mark "II" by "5", the mark "III" by "7", and the mark "IIII" by "8".

It will be noted, in FIG. 19, that, at some combinations of orientations of the blocks, the tension-link lies at an angle to the vertical. This is usually of no consequence.

In order to make the adjustment, of course the coupling has to be withdrawn from its profiled slot in the beam. However, this is not a problem. Usually, a splicing job requires the splicer to have several pairs of beams, and the adjustments are done one link-unit at a time. Thus, there would not be a time when the beams were unsupported, as a set.

It is a trivially simple matter, when the faces of the blocks are suitably marked, for the operators to ensure that all the link-units are set to the same distance. In fact, a good discipline for the operators to follow is to photograph the set of links (i.e two photos, one from each side of the belt), after adjustment, with all the indicia showing, as conclusive evidence that the failure, if a failure occurred, was not caused by improper adjustment. Such evidence is trivially easy to provide with the tension-link units as described herein, but would have been too difficult with the traditional rod-and-nuts links.

When the tension-link units are being assembled, in the factory, the cheek-blocks should be assembled to bosses of the tension-link such that, in respect of all four of the blocks, all the numbers always show upright.

The scope of the patent protection sought herein is defined by the accompanying claims. The apparatuses and procedures shown in the accompanying drawings and described herein are examples.

The numerals used in the drawings can be summarized as:
21a,b (ends of) belt
3 belt-splicer
25 heater platen 27 inflatable pressure pad
29 U,L upper beam, lower beam
30 tension-link unit=tension-link+couplings
32 stop-pin
34 hollow space in beam extrusion
36 slot/recess in side-wall of beam
38 side-wall of beam
40 force-transmitting surface of beam, in slot/recess
41 U,L engagement-face of cheek-block of coupling of tension-link unit
43 cheek-block of coupling
45 endless-loop of rope
47 U,L upper boss, lower boss
49 tension-link
50 U/L upper and lower couplings; coupling=cheek-block+pivot-pin
52 pivot-pin
54 through-hole in boss
56 plastic covering of tension-link
58 mandrels, used in the plastic mould
60 mould-half
61 elongated left-side hole in mould-half
63 U,L upper and lower load-receiving metal surfaces
65 cut-out in end of beam

The invention claimed is:

1. A tension-link unit for a belt-splicer, wherein:
the tension-link unit combines a tension-link with upper and lower couplings, and a tension-member, and upper and lower bosses;
the tension-member is attached to both bosses, and is effective to prevent the two bosses from moving apart relatively, when loaded in operation;
in the tension-link unit, each coupling is attached to a respective boss;
each coupling includes a respective engagement-face, which is arranged for operative engagement with a force-transmitting surface of the machine;
each coupling includes a pivot, which enables rotation of the tension-link relative to the machine, about an axis that is orthogonal to the length of the tension-link;
the tension-link unit, in which the tension-link and the two couplings are integrated together, can be picked up and handled as a robust self-contained unitary whole structure;
each coupling includes a cheek-block;
each respective engagement face is a face of a cheek-block;
each pivot enables its respective cheek-block to rotate with respect to the tension-link;
the tension-link unit, with its two couplings, is so arranged in relation to the machine that:
when force is applied, during operation of the machine, that urges the force-transmitting surfaces to move apart, that force also urges the engagement faces of the couplings of the tension-link unit to move apart;
with respect of the couplings, the force passes in a force-line from the engagement-faces of the cheek-blocks to the pivots, and from there to the load-receiving metal surfaces of the bosses, and from there into the tension-member.

2. The tension-link unit of claim 1, wherein:
the cheek-blocks are so mounted with respect to the tension-member and the two bosses that angular changes in the rotational orientation of the cheek-blocks have no effect on the distance between the axis of the pivots which remains constant and cannot change.

3. The tension-link unit of claim 2, wherein:
a said upper engagement-face of an upper cheek-block is one of four faces, here termed face-FP, face-FQ, face-FR, face-FS of the upper cheek-block;
the upper cheek-block can be rotated about the upper pivot-axis, with the result that any one of the faces, face-FQ, face-FP, face-FR, face-FS becomes the upper engagement-face, depending upon the rotational orientation in which the upper cheek-block is placed;
a said lower engagement-face of a lower cheek-block is one of four faces, here termed face-FP, face-FQ, face-FR, face-FS of the lower cheek-block;
the lower cheek-block can be rotated about the lower pivot-axis, with the result that any one of the faces, face-FP, face-FQ, face-FR, face-FS becomes the lower engagement-face, depending upon the rotational orientation in which the lower cheek-block is placed;
the distances from the upper pivot-axis to the face-FP, face-FQ, face-FR, face FS of the upper-cheek-block are DP, DQ, DR, DS, centimetres respectively;
the distances from the lower pivot-axis to the face-FP, face-FQ, face-FR, face FS of the lower-cheek-block are DP, DQ, DR, DS centimetres respectively;
the distances DP, DQ, DR, DS are different from each other; whereby
the distance between the upper engagement-face and the lower engagement face of the couplings of the tension-link unit can be changed and adjusted by changing the angular orientations of the upper and lower cheek-blocks.

4. The tension-link unit of claim 3, wherein:
an upper cheek-block is a square of side-length L centimetres;
a lower cheek-block is a square of the same side-length L centimetres.

5. The tension-link unit of claim 3, wherein:
face-DP lies opposite a face-DR, and a face-DQ lies opposite a face-DS;
an side-length L is twelve length-units; and
a distance DP is four units, a DQ is five units, a DR is seven units, a DS is eight units.

6. The tension-link unit of claim 5, wherein each face of a cheek-block is marked to visibly indicate different distances DP, DQ, DR, DS respectively.

7. The tension-link unit of claim 1, wherein:
a cheek-block is in two cheek-block elements;
the respective pivot-pin is mounted in both respective cheek-block elements, and is so mounted as to be non-rotatable with respect to both elements, whereby, when one cheek-block element rotates, the other rotates in unison;
the respective two cheek-block elements are disposed one either side of the boss;
the pivot pin passes through a through-hole in the boss, and is rotatable relative to the boss.

8. A belt-splicer, including:
(a) an upper beam and a lower beam, which are arranged both to span across the width of a belt, and each beam has respective beam-ends, which, in operation, protrude beyond left and right side edges of the belt;
(b) an operable pressure-pad, which is effective, when operated, to apply splicing-pressure to the belt, the reaction to which urges the beams apart;
(c) a left tension-link, which links the upper left beam-end to the lower left beam-end;
(d) a right tension-link, which links the upper right beam-end to the lower right beam-end;

(e) an upper-left coupling, by which the left tension-link is mechanically coupled to the upper left beam-end;
(f) an upper-right coupling, by which the right tension-link is mechanically coupled to the upper right beam-end;
(g) a lower-left coupling, by which the left tension-link is mechanically coupled to the lower left beam-end;
(h) a lower-right coupling, by which the right tension-link is mechanically coupled to the lower right beam-end;
wherein the arrangement of the belt-splicer is such that:
(a) together, the left and right tension-links, by mechanically linking the beam-ends, prevent forceful separation of the beams;
(b) when the pressure-pad is operated, the beams, being linked at the respective beam-ends, undergo bending deflection, of such magnitude that, in operation, the beam-ends undergo a substantial angular rotation;
(c) the four couplings are so structured as to enable the respective beam-ends to undergo pivoting movement relative to the respective tension-links; and
(d) the pivoting movement is rotation about respective axes, the alignment of which is orthogonal to the span of the beams, and to the length of the tension-links.

9. A belt-splicer of claim 8, wherein:
the left tension-link includes an upper-left boss and a lower-left boss;
the right tension-link includes an upper-right boss and a lower-right boss;
in respect of each one of the four couplings, the coupling includes a pivot-pin and includes a cheek-block;
the pivot-pin defines the axis of rotation of the said pivoting movement;
the pivot-pin engages the boss;
the pivot-pin engages the cheek-block;
the pivot-pin engages the cheek-block and the boss in such manner that the boss can rotate relative to the cheek-block;
the configuration of the coupling, and of the beam-end, is such that the cheek-block can slide into and out of the beam-end, in a direction lengthwise along the length of the beam; but the cheek-block, when assembled into the beam-end, cannot rotate relative to the beam-end;
the cheek block is formed with a load-face, which is so configured that, when the cheek-block is assembled into the beam-end, the load-face engages a force-transmitting surface in the beam-end.

10. A belt-splicer, wherein:
the belt-splicer includes upper and lower beams, which are arranged to span across the width of a belt;
the upper beam is formed with a cross-sectional profile that defines an upper hollow shape;
the lower beam is formed with a cross-sectional profile that defines a lower hollow shape;
the belt-splicer includes a tension-link-unit, including a tension-link and upper and lower couplings;
the upper and lower couplings are so structured as to mechanically couple the tension-link to respective beam-ends of the upper and lower beams, during operation of the belt-splicer;
the upper coupling includes an upper pivot-pin, which defines an upper pivot axis, which is so arranged that the tension-link can undergo pivoting movement relative to the upper beam-end, about the upper pivot axis;
the upper coupling is so dimensioned and configured that it can slide into and out of the hollow profile of the upper beam, lengthwise along the length of the upper beam;
the lower coupling includes a lower pivot-pin, which defines a lower pivot axis, which is so arranged that the tension-link can undergo pivoting movement relative to the lower beam-end, about the lower pivot axis;
the tension-link of the tension-link unit is so dimensioned and configured that it can slide into and out of the hollow profile of the upper beam, lengthwise along the length of the upper beam;
the lower coupling is so dimensioned and configured that it can slide into and out of the hollow profile of the upper beam, lengthwise along the length of the upper beam.

11. A belt-splicer as in claim 10, wherein;
the profile of the upper beam is the same at every point along its length;
the profile of the lower beam is the same at every point along its length.

12. Procedure for preparing the belt-splicer of claim 10 for handling and
storage, including:
providing the belt-splicer of claim 10;
sliding the lower coupling of the tension-link unit out of the lower hollow shape of the lower beam, such that the lower coupling is clear of the lower-beam, while the upper-coupling is simultaneously present inside the upper hollow shape of the upper beam;
sliding the upper-coupling further into the upper hollow shape of the upper beam, lengthwise along the length of the upper beam, such that the upper coupling, and a portion of the tension-link, now lie inside the upper hollow shape of the upper beam;
sliding the upper coupling and the tension-link further into the upper hollow shape of the upper beam, such that the tension-link-unit, including the upper coupling, the tension-link, and the lower coupling, now lie inside the upper hollow shape of the upper beam.

13. The procedure of claim 12, including providing a stop or stops in the upper beam, which are effective to retain the tension-link-unit inside the upper hollow shape of the upper beam.

14. The belt-splicer of claim 10, wherein, in respect of both beams, the profile of the beam is the same at every point along its length in that the beam is formed as an extrusion.

15. The belt-splicer of claim 10, wherein:
the belt-splicer includes upper and lower beams;
the belt-splicer includes an operable pressure pad, which is effective, when operated, to apply pressure to a belt being spliced;
the structure of the belt-splicer is such that, in operation, the applied pressure is reacted by the beams;
the reaction urges the beams apart, and causes the beams to deflect in bending;
the two tension-link units connect the ends of the upper and lower beams, and prevent the beams from moving apart during operation.

16. The belt-splicer of claim 10, wherein the upper pivot axis is orthogonal to the length of the beam and to the length of the tension-link.

17. The belt-splicer of claim 10, wherein the profile of the upper beam is such as to form a complete enclosure around the hollow shape of the upper beam.

18. The belt-splicer of claim 10, wherein:
the belt-splicer includes:
(a) an operable pressure-pad, which is effective, when operated, to apply splicing-pressure to the belt, the reaction to which urges the beams apart;

(b) the tension-link is termed the left tension-link, and links an upper left beam-end of the upper beam to a lower left beam-end of the lower beam;

(c) a right tension-link, which links an upper right beam-end of the upper beam to a lower right beam-end of the lower beam;

wherein the arrangement of the belt-splicer is such that:

(a) together, the left and right tension-links, by mechanically linking the beam-ends, prevent forceful separation of the beams;

(b) when the pressure-pad is operated, the beams, being linked at the respective beam-ends, undergo bending deflection, of such magnitude that, in operation, the beam-ends undergo a substantial angular rotation;

(c) the four couplings are so structured as to enable the respective beam-ends to undergo pivoting movement relative to the respective tension-links; and (d) the pivoting movement is rotation about respective axes, the alignment of which is orthogonal to the span of the beams and to the length of the tension-link.

* * * * *